May 12, 1931.　　　　　J. C. GROFF　　　　　1,804,413
METHOD FOR CONVERTING THE HEAT ENERGY
OF FUEL INTO USEFUL WORKING ENERGY
Filed April 26, 1927　　　2 Sheets-Sheet 1
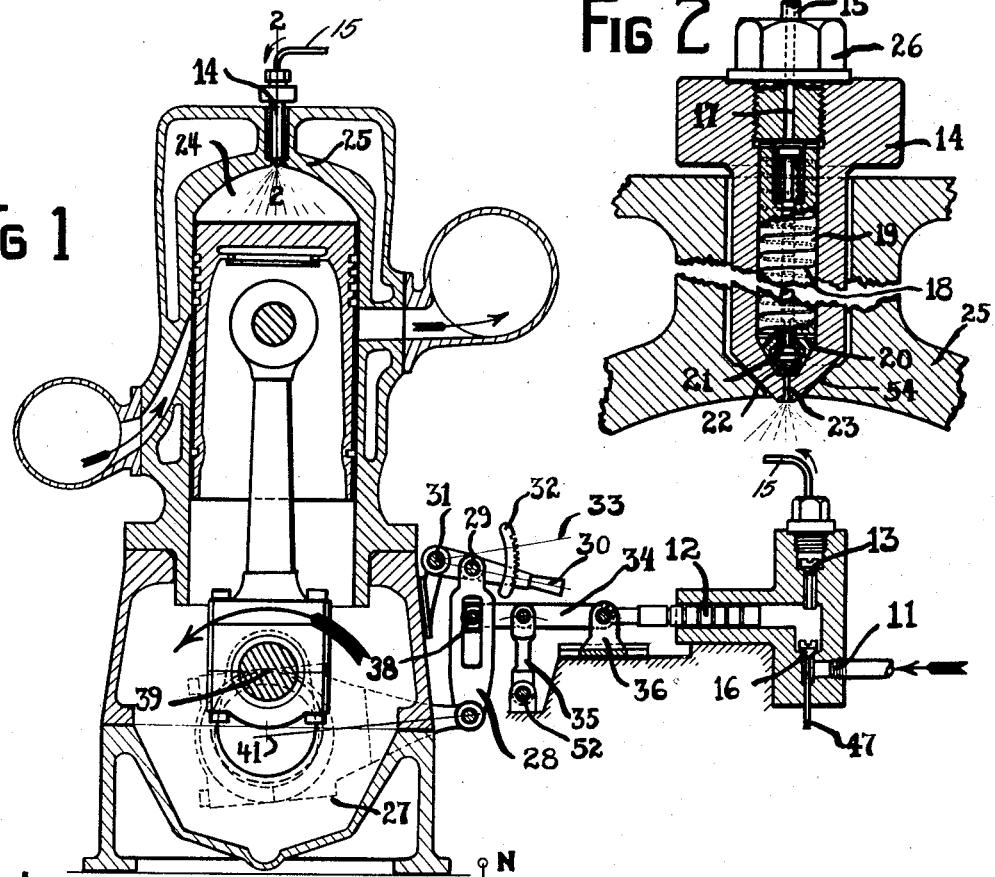
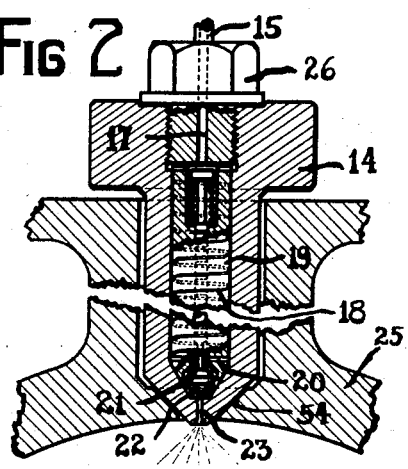
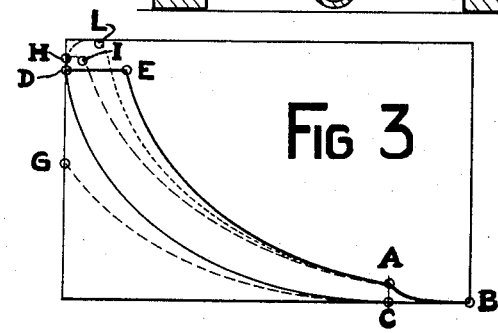
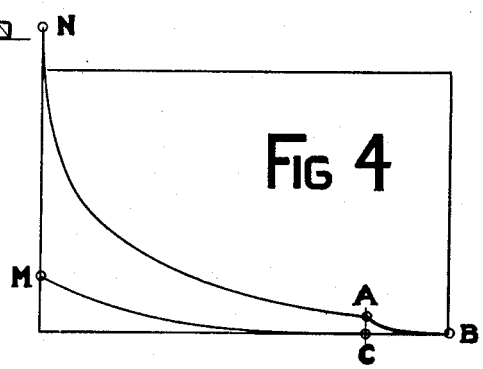
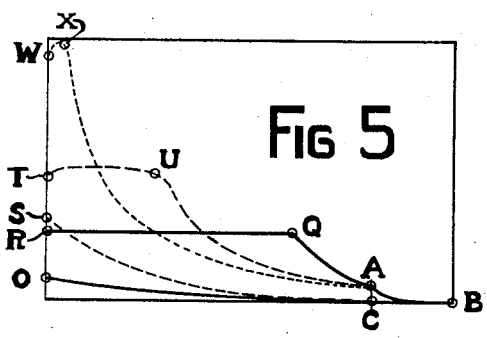
INVENTOR
Joseph C. Groff
BY
Cooper, Kerr & Dunham
ATTORNEYS May 12, 1931. J. C. GROFF 1,804,413
METHOD FOR CONVERTING THE HEAT ENERGY
OF FUEL INTO USEFUL WORKING ENERGY
Filed April 26, 1927 2 Sheets-Sheet 2
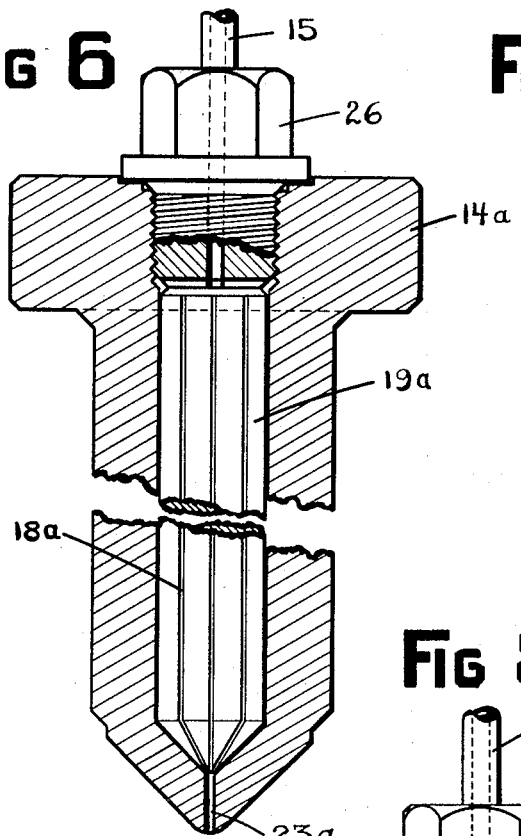
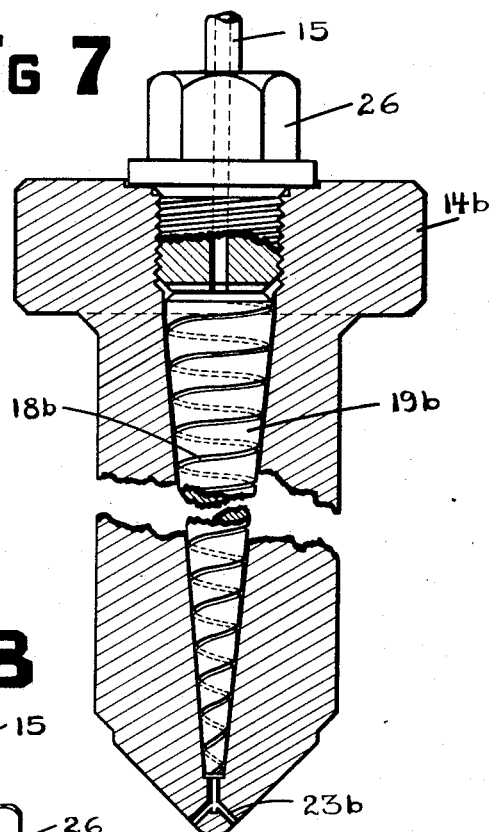
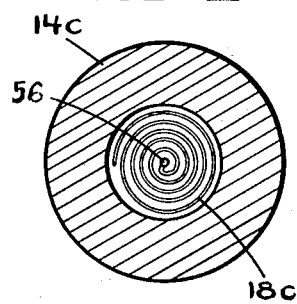
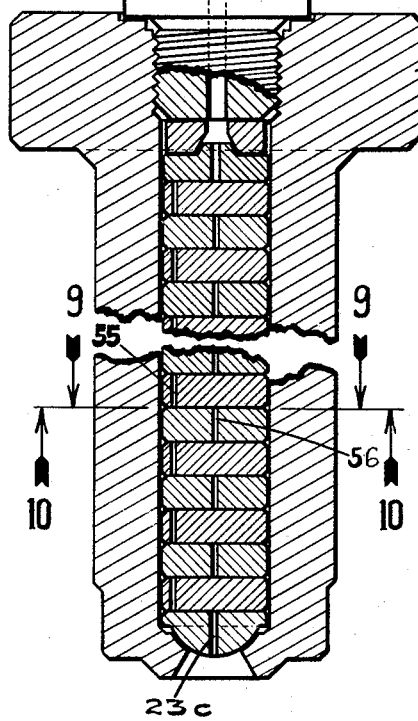
INVENTOR
Joseph C. Groff
BY
Cooper, Kerr + Dunham
ATTORNEYS Patented May 12, 1931

1,804,413

UNITED STATES PATENT OFFICE

JOSEPH C. GROFF, OF NEW YORK, N. Y.

METHOD FOR CONVERTING THE HEAT ENERGY OF FUEL INTO USEFUL WORKING ENERGY

Application filed April 26, 1927. Serial No. 186,642.

The present invention relates to certain new improvements in methods or combustion processes for converting the heat energy of liquid or gaseous fuel substances into useful mechanical effort within the power cylinder spaces of internal combustion engines.

An important object of the present invention resides in the provision of means whereby initial ignition of the fuel charge in an internal combustion engine may be effected by self-ignition without employing excessive compression ratios common to present sparkless-ignition engines.

A further object of the present invention resides in the provision of means whereby internal combustion engines may be adapted to burn gaseous fuels having a high hydrogen content in a more desirable manner than has heretofore been possible.
A further object of the present invention resides in the provision of means whereby internal combustion engines, and particularly the large sized engines now started with compressed air, may be started and maneuvered without the use of present objectionably complicated and costly compressed air devices.

A further object of the present invention resides in the provision of an internal combustion process which may be carried out by means of a turbine in a more acceptable and efficient manner than has been found possible with previous internal combustion processes.

A further object of the present invention resides in the provision of means whereby liquid fuel substances may be heated to raise their eventual temperature considerably above their ignition temperature prior to their being introduced into the combustion spaces of an internal combustion engine without causing destructive distillation of the fuel and clogging of the fuel supply passages.

Other and more detailed objects and advantages of the present invention will be hereinafter pointed out in the accompanying specification and claims and shown in the drawings, which by way of illustration show preferred embodiments of my invention.

In the drawings:

Fig. 1 shows a lateral cross-sectional view of a two-cycle port scavenging reciprocating engine adapted to operate according to my combustion process, and upon liquid fuels.

Fig. 2 shows a longitudinal cross-sectional view of a detailed part of the device diagrammatically illustrated in Fig. 1 and in an enlarged scale. Fig. 2 is taken substantially on the line 2—2 in Fig. 1.

Fig. 3 shows a pressure-volume diagram and illustrates different phases of the Diesel combustion process.

Fig. 4 shows a pressure-volume diagram which illustrates the different phases of the Otto combustion process.

Fig. 5 shows a pressure-volume diagram which illustrates the different phases of my present combustion process.

Figs. 6, 7 and 8 show longitudinal cross-sectional views of certain preferred alternative embodiments of my invention.

Figs. 9 and 10 show detail lateral sectional views of the device illustrated in Fig. 8 and are taken substantially on lines 9—9 and 10—10 in Fig. 8 and respectively looking in the direction of the arrows.

In Figs. 3, 4 and 5 the different P-V diagrams are all laid down to substantially the same scale of co-ordinates, and serve to illustrate the advantages claimed for my present invention. The diagrams shown in Figs. 3, 4 and 5 illustrate operation of a two-stroke engine, such as shown in Fig. 1, where exhaust of the expanding gases commences at points "A" and continues with the scavenging process past the end of the expansion stroke, shown by points "B", substantially up to the commencement of compression, shown by points "C".

It should be understood that my present combustion process may be applied to engines which operate upon the four-stroke principle as well as to two-stroke engines such as shown in the drawings, requiring only the usual slight modifications.

It should also be understood that the terms "internal combustion engine" or more simply "engine", as may be mentioned hereinafter in this specification and in the attached claims, refer not simply to engines of the reciprocating type, but also embrace engines of the rotary type such as turbines.

Referring to Fig. 4, C—M—N—A—B—C indicates the P-V diagram of usual gas engine operation and which closely approximates the ideal Otto cycle internal combustion process. This class of engine compresses its unburned gaseous or else vaporized fuel intermixed with the fresh air for its subsequent combustion. Consequently, compression of said mixture to any desirable extent above, say point M for example, cannot be safely accomplished because of the danger of pre-ignition resulting from the high temperature accompanying such increased compression. Also, it is not feasible to increase the compression of Otto cycle engines beyond certain limits, particularly for cylinders of considerable diameter, on account of the already excessive cylinder pressures and stresses which are associated with Otto instantaneous combustion.

Referring now to Fig. 3, the solid figure C—D—E—A—B—C indicates the P-V diagram of the Diesel cycle of operations for a two-stroke oil engine which is theoretically ideal from the standpoint of mechanically desirable minimum cylinder pressures during fuel admission and combustion. However, such a card is seldom if ever obtained in practice.

The dotted line figure C—D—H—L—A—B—C shows the P-V diagram which is more usually obtained in practice with oil-engines that operate on the socalled "full-Diesel" cycle. Thus, D—H indicates a pressure rise above normal compression due to combustion which has taken place prior to completion of the compression stroke. Further somewhat gradual increase of cylinder pressure due to a high rate of combustion during fuel admission up to the point of cut-off "L" usually takes place somewhat as indicated by the line H—L.

The dashed line figure C—G—D—I—A—B—C indicates the usual P-V diagram obtained in practice by oil engines which operate on the socalled "semi-Diesel" cycle. Such class of engines do not rely solely upon the heat of air compression to ignite the fuel charge, as do "full-Diesel" engines, but must employ supplementary incandescent igniting devices to bring about initial ignition. "Semi-Diesel" engines adopt such generally inefficient and otherwise objectionable ignition and combustion regulating devices as "hot-bulbs", "hot-tubes", "hot-heads", etc., largely in order to lessen the compression ratio and working pressures and stresses and to simplify the construction and cost of the engine.

Thus, it should be noted that both the Otto combustion process and the Diesel combustion process, now used in conjunction with gaseouslike- and with liquid fuels respectively, are restricted against more extensive adoption by certain limiting yet basic and inherent characteristics.

That is to say, in the case of Otto engines, the previously mentioned danger of disastrous pre-ignition precludes; the employment of thermally advantageous compression ratios; the development of desirably large and economical mean-effective cylinder pressures; and the burning of certain desirable grades of high-hydrogen gaseous fuel, particularly in cylinders of large diameter.

Similarly in the case of the Diesel cycle, the compression ratio cannot be chosen to best suit conditions which the engine must operate under, but instead it is necessarily fixed within small limits.

This state of affairs may be better understood by saying that Otto cycle compression ratios cannot be raised high enough and that Diesel cycle compression ratios are too excessively high to satisfy considerations pertinent to mechanical design and operation, and to thermal efficiency.

According to the present invention the foregoing inflexibility of the compression ratio is eliminated, and this is accomplished without necessarily employing secondary ignition devices.

I provide a novel internal combustion process which is characterized by:

(a). Compression of the charge of air to substantially any desirable extent of pressure however high or low; self-ignition of the fuel is not dependent upon the extent of such air compression.

(b). Gradual admission of the fuel to be burned, towards or upon completion of said compression; the fuel, prior to and upon admission, being at a temperature which is sufficiently elevated above its normal igniting temperature to bring about its self-ignition upon admission to the air solely on account of the said fuel's elevated temperature and contained heat upon admission.

(c). Continued admission of the fuel at an elevated temperature and at a comparatively gradual rate up to the point of cut-off, at which point admission terminates abruptly.

(d). Accompanying and subsequent expansion of the products of combustion.

(e). Governing of power output by regulation of the point of admission termination.

Accordingly, in Fig. 5, the solid line figure C—O—R—Q—A—B—C indicates a P-V diagram of my internal combustion cycle which is ideal from the point of view that cylinder pressures are comparatively low and uniform as contrasted with previous combustion processes. However, such an ideal P-V diagram would be subject to considerable variation in practice as regards exact working pressures. Such variations are more or less necessary with any process in order to best accommodate and properly interrelate the various factors and conditions which are encountered with different classes and grades of fuels and with different types and forms of engines.

For example, in the case of engines which have cylinders of comparatively large diameter and which operate at comparatively slow rates of speed, and where it becomes desirable to minimize cylinder pressures, the ideal P-V diagram would be modified somewhat as indicated by the dashed line figure C—S—T—U—A—B—C. In connection with the aforementioned speed of engine operation, it should be understood that slow speed running permits more gradual rate of fuel admission, and over a greater portion of the crank circle, without afterburning and incomplete combustion within the power cylinder, than is permissible at greater running speeds.

Similarly, in the case of engines which operate at high rates of speed, and particularly engines which have cylinders of small diameter and are therefore not subject to restrictions in the matter of cylinder stresses and pressures, the consideration of obtaining low cylinder pressures is of secondary importance to that of insuring that the fuel is completely burned within the cylinder prior to exhaust. Thus, the ideal P-V diagram of my combustion process would preferably be modified to substantially approximate the dotted line figure C—S—W—X—A—B—C for extremely high speed engines, such as automobile and aeronautical practice demand, and particularly when burning the less volatile grades of fuel.

It should be understood that, for any given compression ratio and for any given amount of fuel to be burned, the magnitude of the cylinder pressures accompanying admission and combustion of the fuel are further controlled by the timing of the commencement of fuel admission and also by the comparative rate of such admission. Accordingly, it should be understood that I do not confine my internal combustion process to any specific working pressures.

Referring now to Figs. 1 and 2, I will describe the novel manner in which I prefer to burn liquid fuel substances according to my present internal combustion process. Liquid fuel is supplied to a suitable fuel measuring and injecting pump via pipe 11 (Fig. 1). The pump herein shown is only diagrammatically illustrated and the layout is primarily intended to clearly illustrate the linkage involved to secure velocity control of the oil delivered by the pump. The arrangement shown is not necessarily ideal from the point of view of desirably locating the pump closely adjacent with respect to the injection nozzle 14 in order to desirably minimize the volume of oil in the system, but it will be understood that in practice the pump will have such association with the injector nozzle that a minimum volume of fuel will be disposed between said pump and the injection nozzle. It will be obvious that the details of such a pump may be widely varied and that such a pump must be arranged to pump to the requisite high pressure required and to take into account volume of fuel to be delivered per pumping stroke, the compressibility factor of the fuel, the volume of oil in the injection system, etc. The pressures which the pump is to handle are relatively high. In some instances which are illustrative only, pressures of 82,000 lbs. or even higher might be required while in some cases pressures somewhat lower than 82,000 lbs. down to say approximately 60,000 lbs. per square inch might be required to be handled by the pump. Such fuel is preferably supplied under a comparatively low pressure, either from a gravity tank or a supply pump not shown in the drawings.

The amount of fuel delivered by the injection pump plunger 12 past the non-return discharge valve 13, and to the fuel injector 14 via the supply pipe 15 may be controlled in any desirable manner. Preferably, however, the amount of fuel so delivered is regulated by changing the period of time during which the suction-bypass valve 47 is closed on its seat 16. This may be accomplished in any suitable manner not pertinent to the present invention and therefore means for doing so are not shown in the drawings.

Fuel, delivered past the discharge non-return valve 13 and supply line 15, enters the injector 14 via any suitable conduit such as the drilled hole 17 in the screwed cap piece 26. It should be understood that, during flow of the fuel from the pump through pipe 15, conduit 17 and all adjacent fuel passages or spaces, the fuel is under considerable pressure from the pumping means and acts accordingly upon the various parts of the fuel system.

As shown more clearly in Fig. 2, the fuel is forced to traverse the extended tortuous duct 18 which is formed by and between the core piece 19 and a closely fitting bored out portion of the injector body part 14. At the discharge or far end of the spiral duct 18 any suitable passages, such as the drilled radial conduits 20, which cooperate with fluted passages 21 in the stem portion of the non-return check valve 22, further conduct the fuel up to and by said valve and thence to the admission nozzle or nozzles 23.

The check valve 22 serves to prevent the passage of compressed air or gases from the combustion space back through the injector passages during the intervals between successive fuel admission actions. It is preferred that such a check valve be employed in connection with engines which operate at comparatively slow speeds. However, such a check valve may, and it is intended that it should, be omitted in connection with the smaller extremely high speed engines. It should be understood that the extended length and small lateral cross-section of the duct or ducts 18, features which will be described in more detail hereinafter, together with the advantageous small period of time lapsing between successive fuel deliveries, all afford in themselves the functions of such a non-return valve.

The fuel to be burned within the power cylinder is supplied to and forced through the lengthy duct 18 by subjecting said fuel to considerable pressure as previously mentioned. Consequently, the fuel is forced through the lengthy duct 18 at a tremendous velocity because the lateral cross-sectional area of said duct 18 is intentionally made extremely small with just this purpose in view.

The frictional effects, which tend to retard such rapid passage of the fuel through such a small sized duct, cause heating of the fuel by and upon such passage therethrough. By making the length of such a small sized duct sufficiently long, the fuel may be heated sufficiently in passage so that its eventual temperature will greatly exceed its ignition temperature upon its completely traversing the duct.

As regards proportionment of the length and/or the cross-sectional area or size of the aforementioned heating duct, it should be understood that this is a factor which is largely dependent upon other numerous supplemental and interacting factors such as particularly:

(a) the ignition temperature of the fuel to be used, (b) the viscosity and chemical nature of the fuel to be used, (c) the initial temperature of the fuel as supplied to the heating duct by the supply pump, (d) the rate at which it is desired to supply fuel to the engine, (e) the running speed of the engine, (f) the velocity at which it is desired to force the fuel through the heating duct, (g) the compression ratio of the engine, etc.

Thus suppose it is considered, for example, that a fuel heating duct has a given length and a given cross-sectional area which is satisfactory for the purpose of heating fuel of a given viscosity and chemical nature to some desired temperature, say, greatly in excess of its ignition temperature upon forced flow of the fuel through the duct at a given velocity as caused by its initial supply to the duct at a given pressure. Then, different fuel of a greater viscosity (chemical nature being assumed unchanged) would require that the rate of flow through the duct be lessened to secure the same given desired heating effect, or else, that the pressure applied on the fuel at the entrance to the duct be increased to maintain unchanged the given desired rate of flow through the duct.

In practice, I prefer that the heating duct be given such a length and such a cross-sectional area as will best adapt it to function in conjunction with some certain grades of liquid fuels which particular classes or types of engines usually adhere to within comparatively close limits. Different grades of fuels of widely varying characteristics (though particularly viscosity) for such particular class of engines would require different respective considerations in the matter of length and size of the heating duct. However, it should be pointed out that even a duct of given length and size may be adapted to function over a somewhat widely varying range of fuels merely by varying the rate of forced flow of the fuel through the duct by adjusting the rate at which fuel is supplied to the duct by a positively acting fuel pump as previously described.

It will be realized of course that it would be practically impossible, at least on a commercial scale, to drill holes of such small diameter and of such extended length as would be necessary. Also, it would be equally difficult to draw out a tubular member of such small inside diameter, yet at the same time, having any degree of uniformity of lateral cross-section, and also having the requisite degree of resistance to abrasion or erosion by the fuel.

Instead of employing such difficult and otherwise objectionable means of obtaining small sized lengthy ducts for heating the fuel by frictional effect, I prefer to form such ducts in the novel manner set forth. Thus, in Fig. 2, the core piece 19 has a light continuous spiral grove machined on its surface, preferably after which, it is ground to effect a close sliding fit with the boring of the body portion 14.

With this novel construction, the walls or surfaces of the duct 18 may be better adapted to withstand the eroding effects accompanying flow of the fuel past them, since both the core part 19 and the body part 14 may be properly heat treated and hardened without plugging up the duct with scale formations which usually accompany such hardening processes. Furthermore, in the event of solid foreign matter getting by the strainer (not shown in the drawings) interposed in the fuel supply pipe 11, and stopping up the small sized duct 18, the core piece 19 can be withdrawn and the duct cleared of its obstructing matter.

It should be carefully noted that the function of the lengthy groove 18 is to raise the temperature of the fuel upon passage therethrough. I prefer to have the groove or duct 18 in the form of a spiral in order to secure the greatest length of duct within as concentrated a region as possible. However, arrangement of such fuel heating ducts and their supply passages is obviously subject to considerable variation to best suit different individual design and operating conditions without departing from the broad scope of my invention.

For example, the lengthy duct 18, shown as being a spiral, may be fashioned otherwise so as to run parallel to the longitudinal axis of core part 19 as a flute like straight groove shown in Fig. 6. Also, lengthy ducts of such small size may be formed by and between mating parts of different shape than those shown in the drawings. Thus as shown in Fig. 9, one side of a flat disclike, or the end of a cylinderlike, part might have a lengthy small groove or duct turned, stamped, etched, or otherwise indented into its abutting face, in the form of a spiral on a plane surface, or otherwise. Said abutting face would be firmly and closely pressed against a mating surface to form a lengthy duct of small lateral area, or a series of such ducts. Also, the core piece 19 in Fig. 2 may be shaped differently; it may be conical instead of cylindrical, in which case it would mate with a tapering bored out portion of the body portion 14 as shown in Fig. 7.

In Figs. 6 to 10 inclusive, similar parts are given similar reference numerals to those in the previous figures. Certain parts which are modified in form are given subscript numerals, viz. part 14 is shown at 14a and 14b in Figs. 6 and 7 respectively, 18, 19 and 23 are shown as 18a, 19a and 23a in Fig. 6. Corresponding and differently formed parts in Fig. 7 are shown as 18b, 19b and 23b and in Figs. 8, 9 and 10 the part which corresponds to 14 is shown as 14c.

The spiral or flute-like ducts which are herein provided are not simply intended to function as conduits per se, but are also intended to effect a desired heating effect upon the fuel and are also intended to afford this desired heating effect by their small cross-sectional area and extended length instead of merely imparting a whirling motion with no regard to the heating effect as heretofore.

The heating action, which according to the present invention is effected upon the fuel, may crudely, though to a very great extent, be likened to the burning of one's hand when attempting to check a rope which is rapidly passing therethrough. In such an analogous case, the hand is subjected to constant frictional effect by the constant passage of respective successive portions of the rope, and it almost immediately becomes exceedingly hot while the rope is seemingly unaffected, as regards becoming heated to any great extent. This is due to the fact that the hand undergoes constant frictional effect, while each portion of the rope, on the other hand, is subjected to frictional effect by the hand which is of short duration and occurs but once for each successive portion.

In the present case where an extremely small wire like stream of liquid fuel is forced through a lengthy duct at high velocity, each successive portion of such a stream or column of fuel undergoes much the same action as the previously mentioned hand, in that it is subject to continued frictional, and therefore, heating effects in moving past the wall surfaces of said duct.

On the other hand, while each successive portion of said wall surface of the duct is also subjected to similar frictional effects from the fuel moving thereby, the duct walls are not heated to anywhere near the same extent as are the respective portions of the fuel stream. This is largely because each portion of the duct is continually subject to cooling effect by oncoming and somewhat cooler portions of the fuel stream. Of more importance to be noted, is that the fuel stream passes through the duct at such high velocity and in such a small space of time, that there is little if any opportunity for transfer of heat from the moving fuel stream to said duct surfaces. And in this connection, it will be understood that a good deal of the heating action which is effected upon the fuel stream is caused, not alone by friction against the duct walls, but also by secondary internal friction within the fuel itself. That is to say, skin friction with the duct walls sets up an action whereby the layer of fuel adjacent to the duct walls tends to move with less velocity than do the inner layers of the fuel stream. Such an action sets up frictional effects between different inner and outer layers of the fuel stream, which is referred to as internal friction since it takes place within the stream of moving fuel itself.

It is of importance to understand, that, as previously mentioned, the fuel is subject to tremendous pressure while passing through the heating duct 18 and the injecting or admission nozzle 23, and this pressure is sustained almost uniformly up to the point of final ejection from the nozzle. Consequently, the fuel, being under such pressure, may be heated greatly above the temperature, at which destructive distillation would normally occur under atmospheric pressure conditions, without such destructive distillation taking place to clog up the duct and nozzle passages.

However, the heated fuel, upon being admitted into the charge of air within the power cylinder, which air has preferably been compressed to any desired extent which will best satisfy the individual operating conditions, is almost instantly changed from its original liquid state to a state of superheated gasification solely by virtue of its self-contained heat. The degree of such superheat, if any, depends largely upon its heat content prior to being admitted into the cylinder, and also upon the characteristics of the fuel in question.

Consequently, the fuel exists not merely in a combustible gaseous state but also at a temperature greatly exceeding its ignition temperature immediately upon its entrance into the charge of air within the combustion space 24. Therefore, initial self-ignition takes place and combustion commences practically on the instant of initial fuel admission. The rate of such combustion, together with the accompanying cylinder pressures, is, however, dependent upon the rate at which the fuel is gradually admitted, and this is controlled by the velocity of movement of the fuel pumping plunger for any given rate of engine speed.

It is of importance to note, that, as previously mentioned, the fuel initially enters the combustion space 24, not in the cold liquid state as is the case in the Diesel process, but in a heated and substantially gasified state.

Consequently, according to my internal combustion process, no intervening period of time need elapse between the instant of initial admission and initial self-ignition of the fuel, and no period of time subsequent to admission is required to properly heat and gasify the fuel as is necessarily the case with the Diesel process. Therefore, according to my internal combustion process, the rapidity and degree of completeness of combustion of the fuel are not dependent upon a limiting time factor and are thus independent of the engine speed to a far greater extent than in the case of the Diesel process.

I provide a novel liquid fuel pumping arrangement, whereby the rate of fuel delivery thereby, which rate obviously determines the velocity of fuel passage through the duct 18, may have any desirable value regardless of desirable changes in speed of the engine.

It should be understood, that different grades of liquid fuels, particularly the heavier grades of so-called "fuel oil" require more heating effect and therefore greater velocity of flow through the heating duct 18 than do the other lighter and more volatile fuels, and vice versa.

Thus in Fig. 1, the fuel pumping plunger 12 is given reciprocating movements by the cranklike driving member 27 which acts to oscillate the link 28 about its pivoting point 29 on the suspending arm 30. The suspending arm 30 is itself adapted to pivot about the fixed fulcrum point 31 and to also engage the notched control quadrant 32.

Pivoting adjustments of arm 30 change the vertical position of the slotted out portion of link 28 and causes lengthening or shortening of the distance between the operating joints 29 and 38 to respectively effect quicker or slower rates of reciprocating movement of joint 38. That is to say, since without such change the pump speed varies directly with the speed of the engine which drives it, the arm 30 would be in the position shown by line 33 for the slowest running speed, in its full line position for full running speed, and in intermediate positions for intermediate running speeds.

The connecting link 34 is adapted not merely to drive the fuel plunger 12 at various velocities, but also, to prevent its imparting lateral forces to said plunger, and this is accomplished by the oscillatable supporting link 35 and the guided crosshead 36.

It is of importance to note that the respective dead-center positions of the power piston's crank 39 and of the fuel pump driving cranklike means 41 are out of phase by substantially 90-crank degrees. With this construction the fuel pump is adapted to produce a substantially uniform rate of fuel delivery to the fuel injector 14 since fuel admission takes place only during a comparatively small portion of the time during which crank 41 is passing through the vicinity of its mid-stroke position. That is to say, the aforesaid mid-stroke position of crank 41 is thus made to coincide with the top dead center position of the power crank 39, viz., with the corresponding point of fuel admission.

One of the chief difficulties that have been encountered in attempts to adapt a turbine to carry out previous internal combustion processes, has been that of dealing with compression of the air to self-ignition temperatures and pressures. In the case of turbines using gaseous fuels this difficulty has been circumvented by employing the Otto combustion process with spark ignition. However, in the case of oil turbines, spark ignition has proven extremely unsatisfactory and such turbines which have attempted to carry out the Diesel combustion process have been characterized by extremely low operating efficiency, due largely to difficulties associated with such high compression pressures.

It should be understood therefore, that my present internal combustion process is more readily adapted to oil-gas-turbines than previous processes because self-ignition can be secured without necessarily resorting to high compression pressures.

Present forms of internal combustion engines, with particular reference to the larger sized engines, are started up by admitting compressed air to the power cylinders and running the engine as an air engine from a supply of compressed air which must be compressed and stored in tanks for this purpose. Such auxiliary air storage and compressing facilities entail considerable additional first cost of the plant installation together with other objectionable features which encourage provision of more satisfactory alternative starting means.

Thus, I provide a fuel temperature raising injector which is substantially similar to the previously described injector 14 shown in Figs. 1 and 2 and which is proferably mounted in any suitable part of the wall portion 25 of the power cylinder combustion space 24. Any suitable fuel pumping means, auxiliary to the main fuel injecting pump or otherwise, but being arranged with respect to the injector 14 in a manner substantially similar to that shown in Fig. 1, is provided and adapted to be driven by means independent of the engine to be thus started up. That is to say, crank 41 for the main pump shown in Fig. 1, or its equivalent for a similar but auxiliary pump, is driven by means independent of the engine during the starting up period.

The bypass valves, which control the injecting action of such an auxiliary fuel pump for engine starting, are similar to the valve 47 shown in Fig. 1, and are timed by any suitable means, though preferably by the same timing control means (not shown in the drawings as previously explained) used for the main running pump bypass valves 47. The aforesaid timing of these bypass valves is preferably (for starting conditions only) such that starting fuel is admitted into any power cylinder the piston of which is past its top dead center position on the down stroke. The amount of fuel so admitted to any one cylinder would of course be limited to prevent occurrence of dangerous cylinder pressures.

Thus, by means of such novel provisions, an internal combustion engine may be started up and otherwise operated with much the same ease and flexibility as a reciprocating steam engine. For in fact, the supplying of self-ignitible combustible substance to the cylinders of an internal combustion engine accomplishes the same ultimate purpose as does the admission of steam to the steam engine cylinders.

It should be understood that I do not imply confinement of the principles of my invention to the specific illustrative embodiments shown and/or described as it will be apparent to any one skilled in the art that considerable variation of the features of my invention is permissible, to best suit individual operating conditions, without departing from the broad scope of my invention.

Thus, a different form of pumping means might be employed in conjunction with my novel fuel-temperature raising injector; and the fuel-temperature raising injector may be subject to modification of its detailed construction.

What I claim is:

1. The method of converting heat energy of fuel into useful working energy which consists in compressing a gas or vapor which includes a medium supporting combustion, then gradually introducing the fuel to said compressed gas and in effecting temperature elevation of the fuel by the frictional effect imposed upon the fuel and attendant upon and by this introduction so that the fuel is raised to a temperature of such extent that the fuel will, on account of its own temperature and contained heat and irrespective of the degree of compression of the gas, ignite, and of continuing admission of said fuel while expansion of the burning gases occurs, then discontinuing said admission and further expanding the resultant products of combustion while recovering useful power from said expanding gases.

2. The method of converting heat energy of fuel into useful working energy which consists in compressing a gas or vapor which includes a medium supporting combustion, then gradually introducing the fuel to said compressed gas and in heating the fuel by the frictional effects imposed upon the fuel which are attendant upon its introduction to an elevated temperature of such extent that the fuel will, on account of its own temperature and contained heat and irrespective of the degree of compression of the gas, ignite, and of continuing admission of said fuel up to a certain point, then discontinuing said admission and expanding the resultant products of combustion while recovering useful working effects by said expansion.

3. An internal combustion engine and the like which includes in combination, means for compressing a gas or vapor containing a medium supporting combustion, means for subsequently and gradually admitting fuel thereto, and means for imposing a frictional obstruction to the flow of fuel to such an extent that the fuel temperature will be raised to the igniting point prior to the admission of the fuel to the compressed gaseous medium, whereby initial ignition is initiated solely by the temperature and heat content of the fuel prior to and during its actual admission into said medium.

4. An internal combustion engine or the like including in combination, means for admitting fuel to a pre-compressed combustion supporting gaseous medium, means for forcing the fuel through said means at high velocity, and means for utilizing the velocity and frictional effects which are produced by and upon the supplying of the fuel for elevating the temperature and heat content of the fuel to an igniting point.

5. An internal combustion engine or the like with a fuel admitting and self ignition device comprising a body portion having a restricted and extended lengthy duct for entering fuel, proportioned to cause the velocity of the flowing fuel to be such that the frictional effect upon the fuel heats the same to a point at which self ignition will take place upon eventual arrival of the fuel within the combustion chamber.

6. An internal combustion engine or the like having a combustion space and a wall portion through which fuel is admitted to said space, said wall portion having a tortuous extended and restricted fuel duct therein proportioned to cause high enough velocity of the flowing fuel to raise the temperature of the fuel by the frictional resistance of said extended duct to said flowing fuel, and means for forcing fuel through said duct and thereby raising the temperature of the fuel to a degree which will afford self-ignition of the fuel upon its entrance into the combustion chamber.

7. A fuel temperature raising means for an internal combustion engine or the like comprising mating parts with a tortuous lengthy duct formed thereby and therebetween, said duct having a length and a cross-section which will bring about heating of the fuel to the eventual self-ignition point by and upon the forcing of the fuel through the duct.

8. A fuel temperature raising means for an internal combustion engine or the like comprising mating parts with a plurality of paralleling tortuous lengthy ducts formed thereby and therebetween, said respective ducts having a length and a cross-section which will bring about heating of the fuel to the eventual self-ignition point by and solely upon the forcing of the fuel through said respective ducts.

9. A fuel temperature raising means for an internal combustion engine or the like comprising a plurality of separable machined parts, an extended groove upon at least one of said parts co-operating with the other part to form an extended duct which, by the frictional effect due to its small cross-section and its length, will effect heating of the fuel to an eventual self-ignition point when said fuel is forced to flow at high velocity therethrough.

10. A fuel heater for an internal combustion engine comprising a plurality of coacting parts having a tortuous fuel duct therebetween of such extent of length and such restricted cross-sectional area that heating effects of substantial extent will be imposed upon the fuel by and upon its forced passage through said duct by the frictional obstruction which the duct imposes to the flow of fuel.

11. A fuel temperature raising means for an internal combustion engine or the like adapted to elevate the fuel temperature prior to its injection into the combustion space to a temperature which is desirable to coordinate to the extent of pre-compression therein comprising parts having therein a lengthy fuel duct of length and relatively small cross-section which is adapted to raise the temperature of the fuel to the desired temperature by frictionally heating the same by and upon the forcing of the fuel therethrough and having means associated therewith for forcing the fuel through said duct for the purpose described and for introducing the fuel into the cylinder.

12. The method of starting internal combustion engines from a standstill condition to any desirable running speed which comprises applying pressure to an entrapped quantity of liquid fuel substance, then gradually introducing the fuel into the combustion spaces of the respective power cylinders of the engine to be started, and while paying due regard to the proper timing of said fuel introduction, of forcing the fuel to be so introduced to move at high velocity while under maintained frictional restraint so that the fuel in its passage under frictional restraint and prior to its introduction into the combustion chamber is heated to a point in excess of its igniting temperature by virtue of the frictional restraining effects attendant upon said passage of the fuel to thus effect self-ignition of said fuel upon its aforesaid introduction to thereby initiate its combustion and so create an expansive pressure medium within the power cylinders to start the engine in motion.

13. The method of starting internal combustion engines from standstill to running operation which comprises introducing frictionally heated liquid fuel substance into the combustion spaces of the engine, and in heating said fuel to an elevated temperature in excess of its igniting temperature by frictionally restricting the flow of fuel while being so introduced, and in maintaining the effects resulting from its said flow at high velocity, the duration of such frictional restraint being sufficient to result in self-ignition and subsequent combustion of the fuel so introduced to thus create an expansive pressure medium in the power cylinders for the purpose of starting the engine.

In testimony whereof I hereto affix my signature.

JOSEPH C. GROFF.